United States Patent [19]

Weldon

[11] 4,404,450

[45] Sep. 13, 1983

[54] ROLL WELDING MACHINE AND METHOD OF RECONDITIONING CASTER ROLLS

[76] Inventor: John F. Weldon, 7473 Pebble Pointe, West Bloomfield, Mich. 48033

[21] Appl. No.: 338,391

[22] Filed: Jan. 11, 1982

[51] Int. Cl.$^3$ .............................................. B23K 9/04
[52] U.S. Cl. .............................. 219/76.12; 219/73.21; 219/76.1; 219/76.14; 219/130.01
[58] Field of Search ................. 219/73.21, 76.1, 76.12, 219/76.14, 130.01

[56] References Cited

U.S. PATENT DOCUMENTS 4,322,596  3/1982  Krakow ........................... 219/73.21

Primary Examiner—Elliot A. Goldberg
Attorney, Agent, or Firm—Cullen, Sloman, Cantor, Grauer, Scott & Rutherford

[57] ABSTRACT

A roll welding machine has the frame mounting head and tail stocks for axially supporting a castor roll having a crack therein. The heat source is mounted upon the frame below and along the length of the roll for maintaining said roll at a minimum temperature of 600° F., approximately. An upright support of inverted U-shape is secured to the frame and includes upright standards. Vertically adjustable interconnected slide carriers are mounted upon the standards and connected to a power winch by cables and pulleys. A power reciprocated cross slide is mounted upon the slide carriers and mounts horizontal support beam on which is guidably mounted a travel carriage supporting a depending welding head assembly. A welding wire drive feed head feeds the welding wire from a drum journaled upon the carriage. The side and ends of the roll are enclosed to define a uniform heat zone chamber whereby while the roll is welded, it is maintained at the minimum preheat temperature. The method of weld reconditioning of caster rolls wherein the roll cracks are machine gouged and adjacent roll surfaces are machined and undercut for receiving weld build up and overlay and the roll successively preheated is to a uniform minimum temperature of 600° F., approximately, the improvement comprising the steps of mounting the roll for support and rotation about its longitudinal axis within a roll welding machine, enclosing the roll upon its sides and ends to define a uniform heat zone chamber surrounding the roll, and positioning a heat source below and along the roll length within the chamber to maintain the roll at the minimum uniform temperature and simultaneously welding and filling roll gouges and applying weld build up and overlay.

23 Claims, 11 Drawing Figures

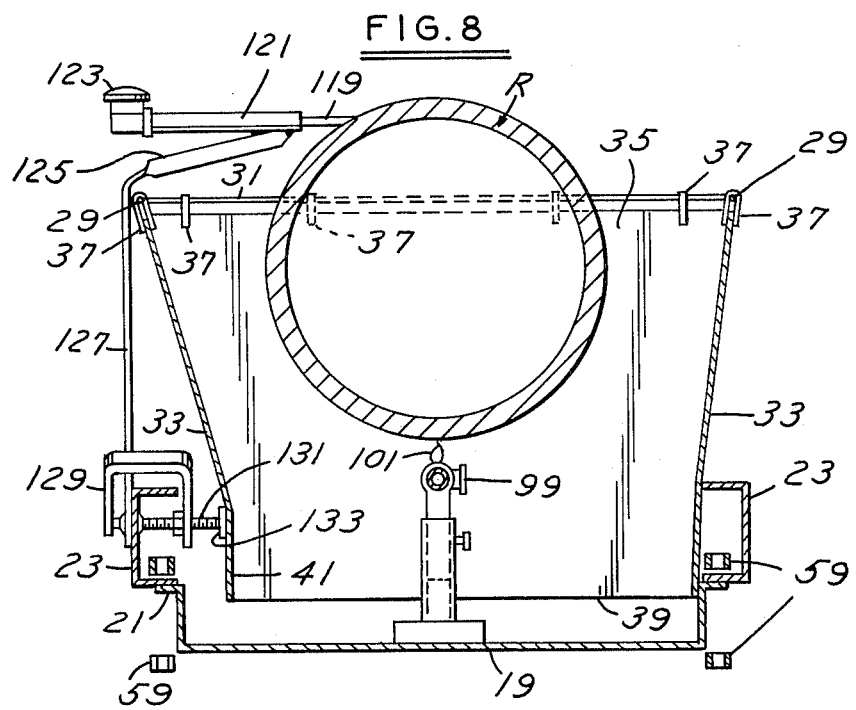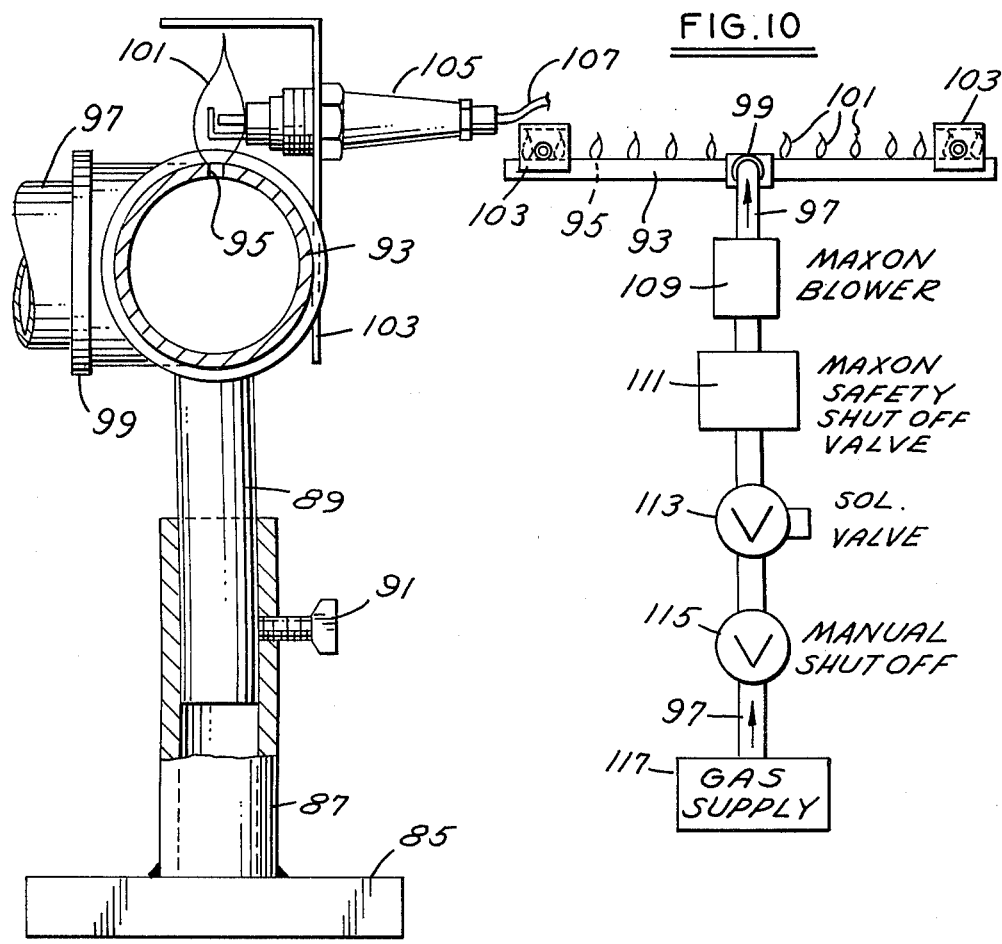

ROLL WELDING MACHINE AND METHOD OF RECONDITIONING CASTER ROLLS

BACKGROUND OF THE INVENTION

Heretofore in the use of caster rolls in steel mills and the like from time to time the rolls become damaged by scars, scratches or cracks and must be reconditioned. Heretofore rolls of this nature are machined by an undercut into the roll surface sufficient for ultrasonic or magnetic particle inspection purposes. Often times an inspection will indicate that the roll is reusable merely by machining to a finished diameter. In other situations the roll will have cracks or gouges therein which will require welding prior to final machining. An initial step in such process is to stress relieve the roll by placing it in a furnace and gradually bringing its temperature up to 750° to 800° F. and soaking it for 2 to 3 hours and gradually cooling to ambient temperature. This is followed by an ultrasonic inspection of the roll for crack determination and location. This is followed by the step of machine gouging the cracks along the length of the roll and throughout its circumference and thereafter machine undercutting the surface in order to receive a weld build up and weld overlay. This has been conventionally followed by a preheat of the roll wherein the roll has been gradually and uniformly heated at approximately 150° F. per hour to the required welding preheat temperature of about 600° F. minimum.

After the roll has been preheated, it is transferred to a roll welding machine which includes a power rotated head stock and tail stock for supporting the roll upon its longitudinal axis and heat is applied to the roll in order to maintain its preheat temperature and interpass temperatures of 600° F. approximately during all welding operations.

Heretofore there has been the problem of continually maintaining the roll at this minimum preheat temperature with the result that failure to maintain such preheat temperature can produce stress, inequalities or imperfections in the roll surface at the welds over portions thereof, particularly at cracks and produce stresses of non-uniform character, so that the roll is suscepticle to early damage in subsequent use. The problem has existed therefore of providing a continuous preheat temperature in the range of 600° F. and for providing assurance continuously that the roll during its welding has maintained this continuous temperature and therefor providing a visual indication of such and also providing a record of the heat treatment and welding of the roll for future inspection as to verification as to whether the welding steps were applied to the steel roll and possibly explain why a roll broke down too soon for lack of maintenance of the preheat temperature during all welding procedures.

SUMMARY OF THE INVENTION

The present invention has a primary object and feature of providing a roll welding machine supporting and incrementally rotating a caster roll upon its longitudinal axis and providing a uniform source of heat to the roll for continuously maintaining its preheat temperature throughout all welding procedures. A further feature is to incorporate into the roll welding machine an upright support of inverted U-shape which is connected to the welding machine frame and arranged laterally of the longitudinal axis between the head stock and tail stock wherein a pair of upright slide carriers are adjustably mounted upon the support standards for vertical adjustments.

A further feature includes a cross support connecting the carriers, upon which is mounted a cross slide including cross slide beams which extend at right angles to said axis and are adapted for adjustment upon the cross support for movements transversely of said axis in a horizontal plane.

A further feature includes the provision of a support beam upon the cross slide spaced above and parallel to said axis and upon which a travel carriage is guidably and reciprocally mounted upon the length thereof.

A further feature includes a welding head assembly mounted upon the travel carriage having a tubular electrode holder outletting adjacent the roll, together with a welding wire feed head for feeding welding wire through the electrode into registry with the roll.

A further feature includes a mounting of a coil of welding wire and journallying it upon the travel carriage for continuously delivering welding wire to the drive feed head.

A further feature includes an arrangement of the welding head assembly for adjustment horizontally and vertically relative to the longitudinal axis of the roll and longitudinally reciprocal along the length of the roll, and with intermittent rotation of the roll along its axis.

An important feature of the present invention is to provide an enclosure means upon the frame of the roll welding machine which is adapted to surround the roll at its sides and ends which extends below the roll enclosing the heat source in order to define a uniform heat zone within which the caster roll is welded for continuously maintaining the roll at its predetermined temperature, such as 600° F., throughout all welding thereof.

A further feature includes upon the roll welding machine a screening or enclosure for the caster roll which is mounted upon the framework so as to be spaced outwardly of the roll sides and ends which extends downwardly below the heat source for providing a heat zone within which the roll is positioned for continuous welding and for maintaining the predetermined heat temperature throughout all welding.

A further feature incorporates upon the welding machine a plurality of thermocouples at spaced points along the roll to measure the temperature of the caster roll continuously during welding and to provide corresponding electronic recorders having charts for continuously recording the time and temperature of the roll and for verification of the maintenance of said predetermined temperature for visual inspection or for storage and subsequent review.

In the method of reconditioning castor rolls, the cracks are machine gouged and adjacent roll surfaces are machined and undercut for receiving weld build up and overlay. There is a conventional preheating of the roll to a minimum uniform temperature of 600° F. approximately. A further feature includes an improvement in the method which comprises the further step of mounting the elongated steel roll for support and rotation upon its longitudinal axis within a roll welding machine. A further step includes loosely enclosing the roll upon its sides and ends to define a uniform heat zone temperature surrounding the roll, and at the same time positioning and maintaining a source of heat below and along the length of the roll, and continuously maintaining the roll at a uniform minimum temperature, and simultaneously with welding and filling of the machine gouges, applying weld build up and weld overlay, and wherein the source of heat maintains the minimum heat and interpass minimum temperatures during all welding operations.

A further feature includes the step of continuously monitoring and recording the temperature of the roll during said welding operations, by using a plurality of thermocouples engaging to the roll at spaced points and connecting a pyrometer including a chart to each thermocouple for visually verifying time and temperature conditions during welding and for storage of such information for subsequent verification.

These and other objects and features will be seen from the following specification and claims in conjunction with the appended drawings.

THE DRAWINGS

FIG. 8 is a fragmentary section taken in the direction of arrows 8—8 of FIG. 5.

FIG. 9 is a vertical section of the heater assembly shown in FIG. 8, on an increased scale partly in cross section.

FIG. 10 is a side elevational view of one of the heater manifolds with a schematic illustration of the control connections to a gas supply including valves and a blower.

It will be understood that the above drawings illustrate merely a preferred embodiment of the invention and the method steps therein and that other features and embodiments are contemplated within the scope of the claims hereafter set forth.

DETAILED DESCRIPTION OF AN EMBODIMENT OF THE INVENTION

Figure 4:
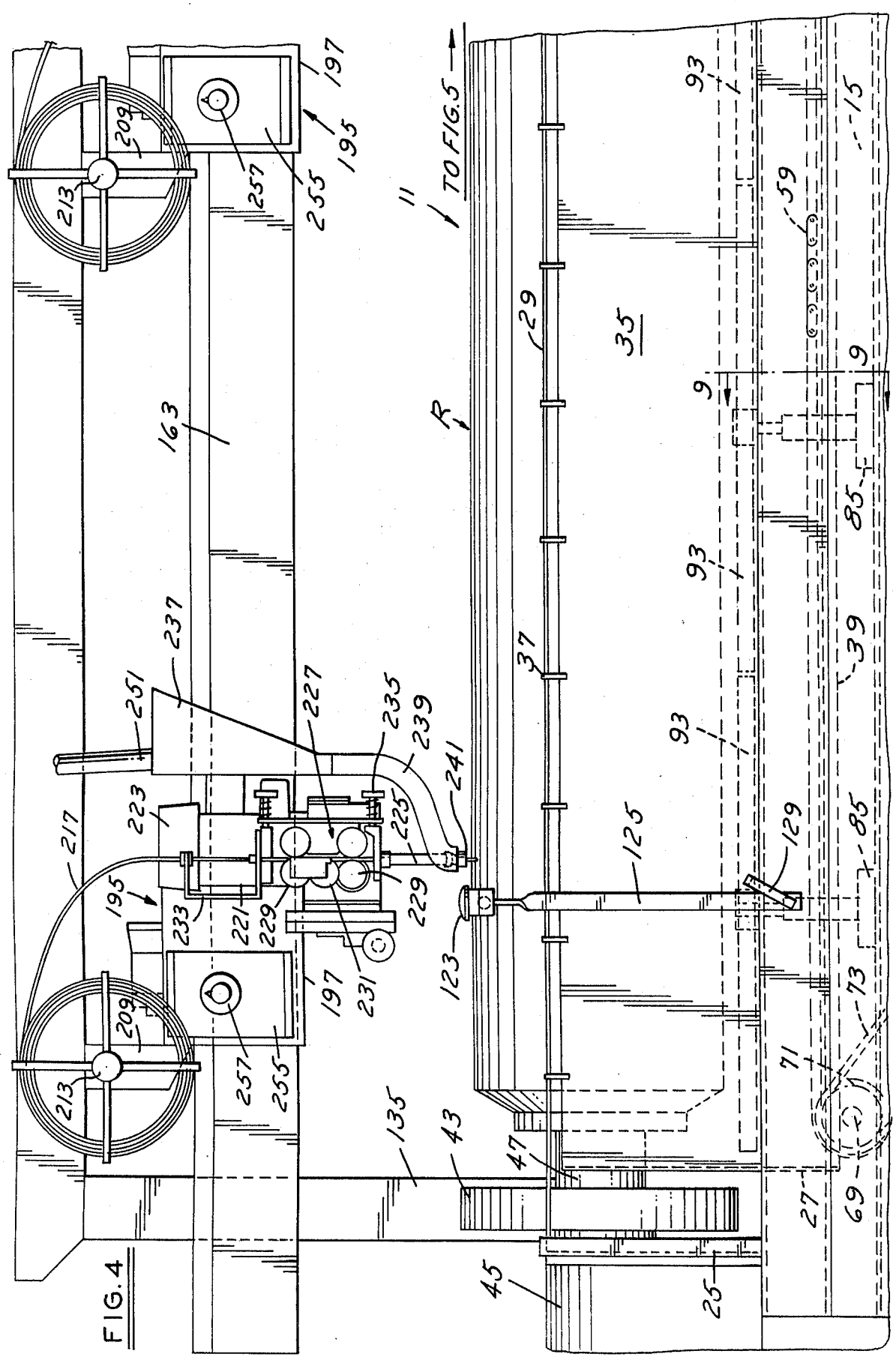
FIG. 4 is a fragmentary side elevational view of the roll welding machine with caster roll mounted thereon and the welding apparatus.
Figure 5:
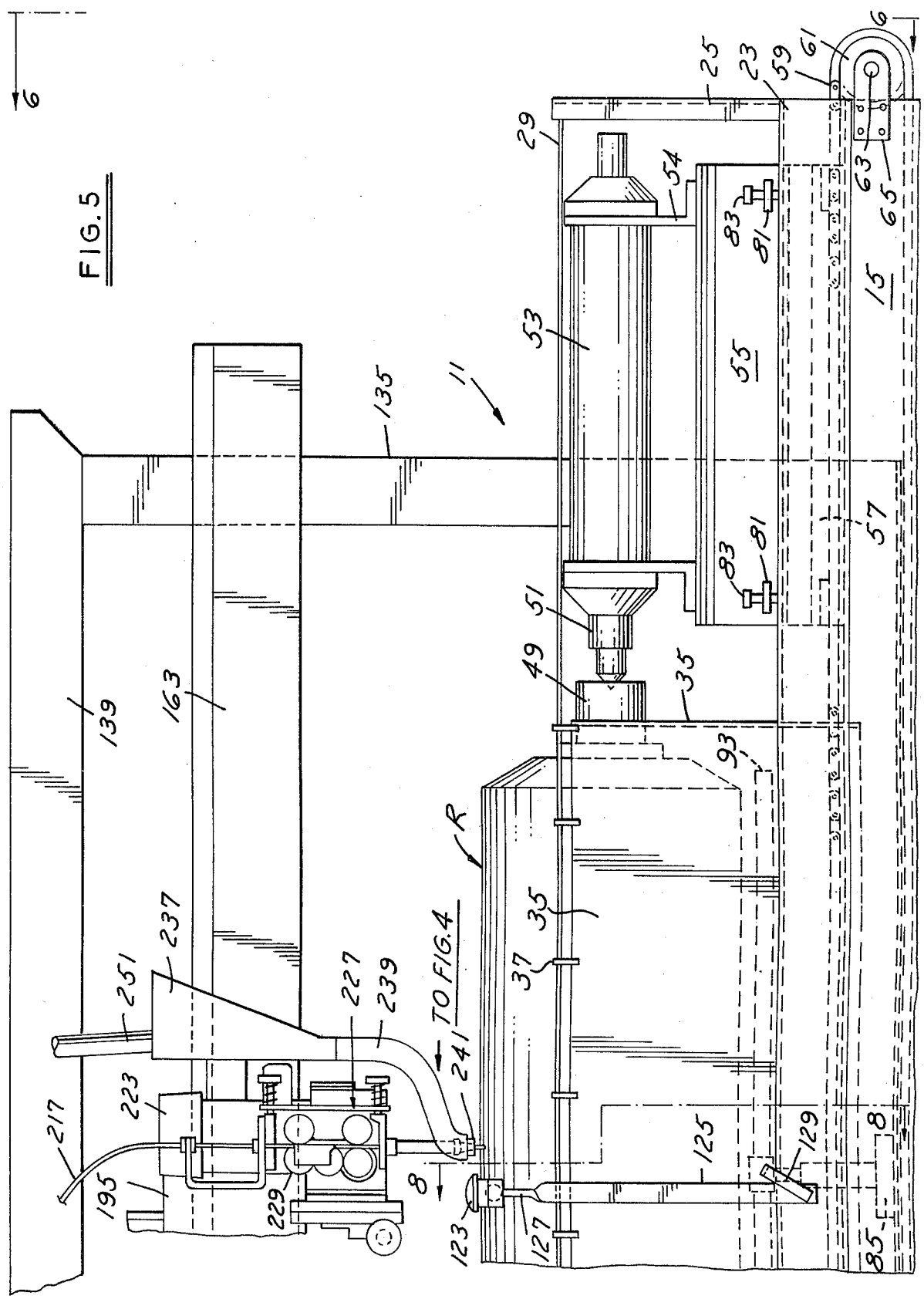
FIG. 5 is a corresponding side elevational view as a continuation of the machine partically shown in FIG. 4.

The present welding and heating apparatus is generally indicated at 11, FIGS. 4 and 5 and includes a frame 15 mounted upon a support surface 13. The frame includes depending supports 17, FIG. 6, as a part of the frame and a transverse elongated bed 19 which has upon its opposite longitudinal edges the elongated support flanges 21 in registry with portions of the frame which includes a pair of opposed elongated spaced U-beams 23.

The frame includes at its opposite ends, opposed pairs of upright rear supports 25 and front supports 27 formed of right angle stock for strength. Support means in the form of a rod or wire extends between the upper ends of adjacent supports upon the sides at 29 and at the ends as at 31, FIGS. 4, 5 and 6. A heat zone enclosure is adapted to receive the preheated caster roll R within the roll welding machine. Said enclosure includes opposed pairs of upright imperforate metalic side screens 33 and end screens 35 which are mounted upon and suspended from the wire supports 29 and 31 using a series of screen clips 37, FIGS. 4, 5 and 6. Said screen clips are mounted upon the respective wires or rods 29 and 31 and frictionally and retainingly engage the upper edge portions of the side screens 33 and end screens 35. The lower longitudinal edges 39 of the screens extend below caster roll R journalled upon its axis within the roll welding machine. Said screens surround a large portion of the heat source 89, 93 for said roll to provide a zone enclosure area for the roll for maintaining its initial preheat during all welding procedures for reconditioning the roll.

The present welding machine includes upon the frame 15 a power operated head stock 43 connected to support shaft 47 of the roll R. The coaxial roll shank 49 at the opposite end of the roll is axially journaled on tail stock 51. Coaxial tail stock body 53 is supported by a pair of spaced bracket plates 54 secured upon the tail stock mount plate 55, FIGS. 5 and 6.

Figure 6:
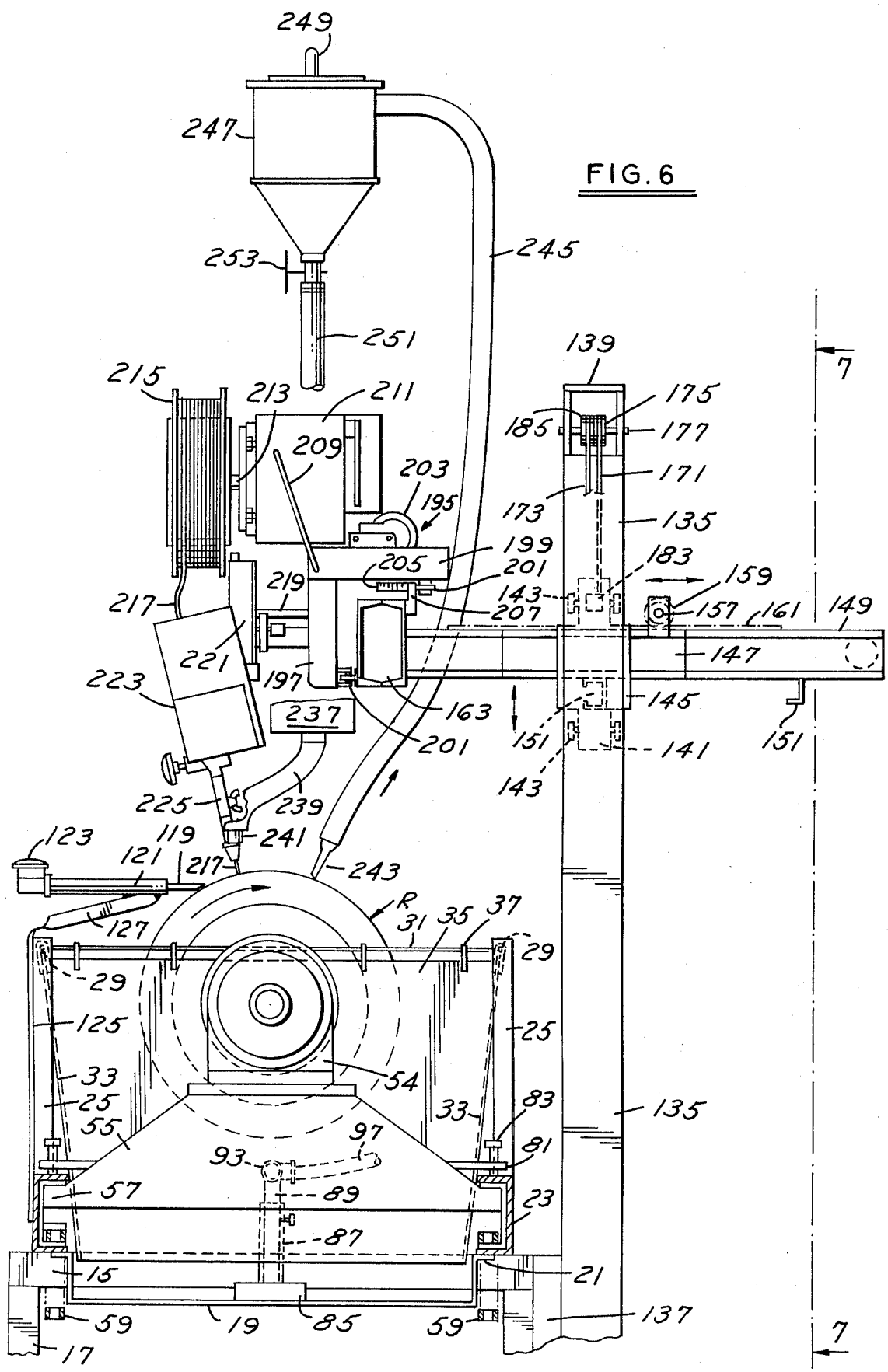
FIG. 6 is a fragmentary end view of the roll welding machine taken in the direction of arrow 6—6 of FIG. 5.

Said mount plate includes at its opposite ends the transverse side supports 57 which extend into the channels 23 forming a part of the framework and are adjustably supported thereon by the laterally extending side flanges 81 and adjustable anchor screws 83, FIG. 6.

Adjustment of the tail stock 51–53 is accomplished by a pair of laterally spaced parallel continuous sprocket chain loops 59 which at their one ends are mounted upon idler sprockets 61 upon the transverse shaft 63 journalled upon bearing brackets 65 further shown in FIG. 5.

Figure 3:
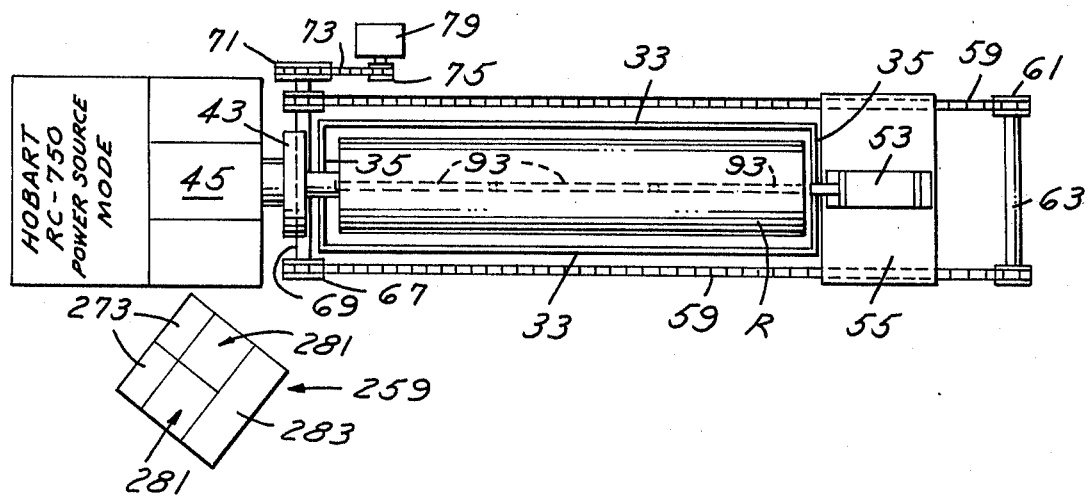
FIG. 3 is a plan view of a portion welding machine which includes a screen enclosure surrounding the roll during welding.

The chain loops 59 at their opposite ends are mounted around the pair of drive sprockets 67 secured upon drive shaft 69 upon suitable bearing supports similar to supports 65 shown in FIG. 5. Shaft 69 mounts driven sprocket 71 connected by sprocket chain 73 to drive sprocket 75 on the output shaft of tailstock drive motor 79, FIG. 3 and FIG. 4.

By this construction, activation of the reversible motor 79 will control longitudinal adjustments of the tailstock 51 with respect to the head stock to facilitate the mounting of the preheated roll R upon the roll welding machine for support and rotation about its longitudinal axis corresponding to the headstock and tailstock axis.

A uniform heat source is provided for caster roll R which has been axially supported upon the roll welding machine and includes a series of heaters mounted upon bed 19 of frame 15.

For this purpose there are provided as shown in FIGS. 4, 5, 8 and 9 a series of longitudinally spaced blocks 85 mounted upon the bed 19 centrally thereof. Each block mounts an upright pedestal tube 87, FIG. 9, adapted to adjustably receive support rod 89 in conjunction with set screw 91 for securing support rod 89 in the desired vertical position.

A series of elongated gas burner manifold pipes 93 are centrally mounted and secured to the corresponding support rod 89 and include upon their upper edges a series of longitudinally spaced gas burner outlets 95, FIGS. 9 and 10. Each of the manifold pipes 93 is connected to gas supply pipe 97 by a suitable coupling 99 and to a source of pressurized gas 117 schematically shown in FIG. 10.

Upon each of the manifold pipes 93 at their respective ends on a pair of upright spark plug holders 103, FIGS. 9 and 10 upon which are supportably mounted and secured corresponding spark plugs 105 to provide ignition as desired for the gas burners at their outlets 95. Electrical power is delivered to the respective spark plugs by the lead 107 connected to an electrical power circuit from the control panel 259 FIG. 11.

There is schematically shown in FIG. 10, upon the gas supply pipe 97 a MAXON blower 109, a MAXON safety shut-off valve 111, solenoid control valve 113 connected to the control panel 259, and manual shut-off valve 115 to provide the controlled amounts of pressurized gas to the respective manifold pipes 93.

As shown in FIGS. 4 and 5, the manifold pipes are arranged end to end and extend between the headstock and tailstock and are adapted to underlie roll R throughout its length. Said heaters maintain the roll predetermined temperature which had been theretofore provided in a furnace bringing the steel caster roll R up to the desired predetermined temperature of 600° F., approximately.

As primarily important in connection with the reconditioning of the caster roll by welding within the heat enclosure screening 33, 35, there is provided a plurality of spaced heat testers or thermocouples 119. These are in contact with the roll R at spaced points thereon as shown in FIGS. 4, 5 and 8 and are electrically connected in the pyrometer recorder such as the SPEED-O-MAX H recorders 273 shown in FIG. 11. Such recorder is available on the market and sold by Leeds & Northrup.

Figure 11:
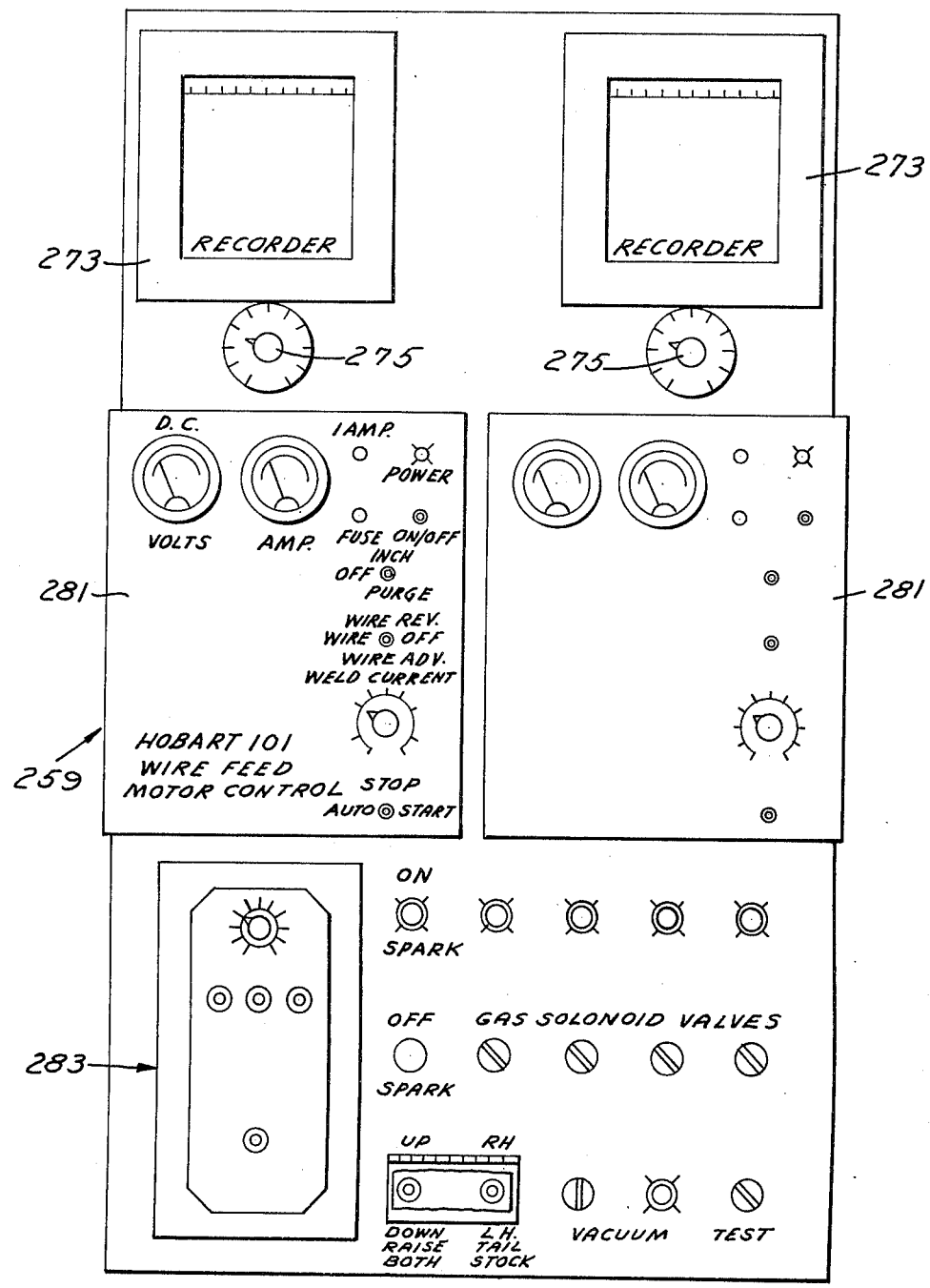
FIG. 11 is a front view of the control panel for the roll welding machine.

Said recorder employs suitable timing components therein with controls at 275, FIG. 11, for regulating the operation of a graph means or chart constantly recording temperature at time intervals during all welding of the roll within the roll welding machine.

The thermocouple 119, FIG. 8, includes support body 121 mounting a visible temperature scale 123 upon the support arm 125 at the upper end of the upright bracket 127. Each of the brackets 127 at its lower end includes arm clamp 129, clamp screw 131, clamp pad 133 for securing to the corresponding beams 23 forming a part of the frame 15.

Arranged upon one side of the frame 15 is the inverted U-shaped support which includes upright spaced standards 135 of U-channels secured to frame 15 at 137, including top channel 139, FIGS. 4, 5, 6 and 7.

Slide carriers 141 are slidably and adjustably positioned within corresponding standards 135 with portions thereof projecting outwardly mounting support plates 145 carrying pairs of guide rollers 143 in cooperative registry with standards 135 guiding vertical adjustments of the slide carriers.

Figure 7:
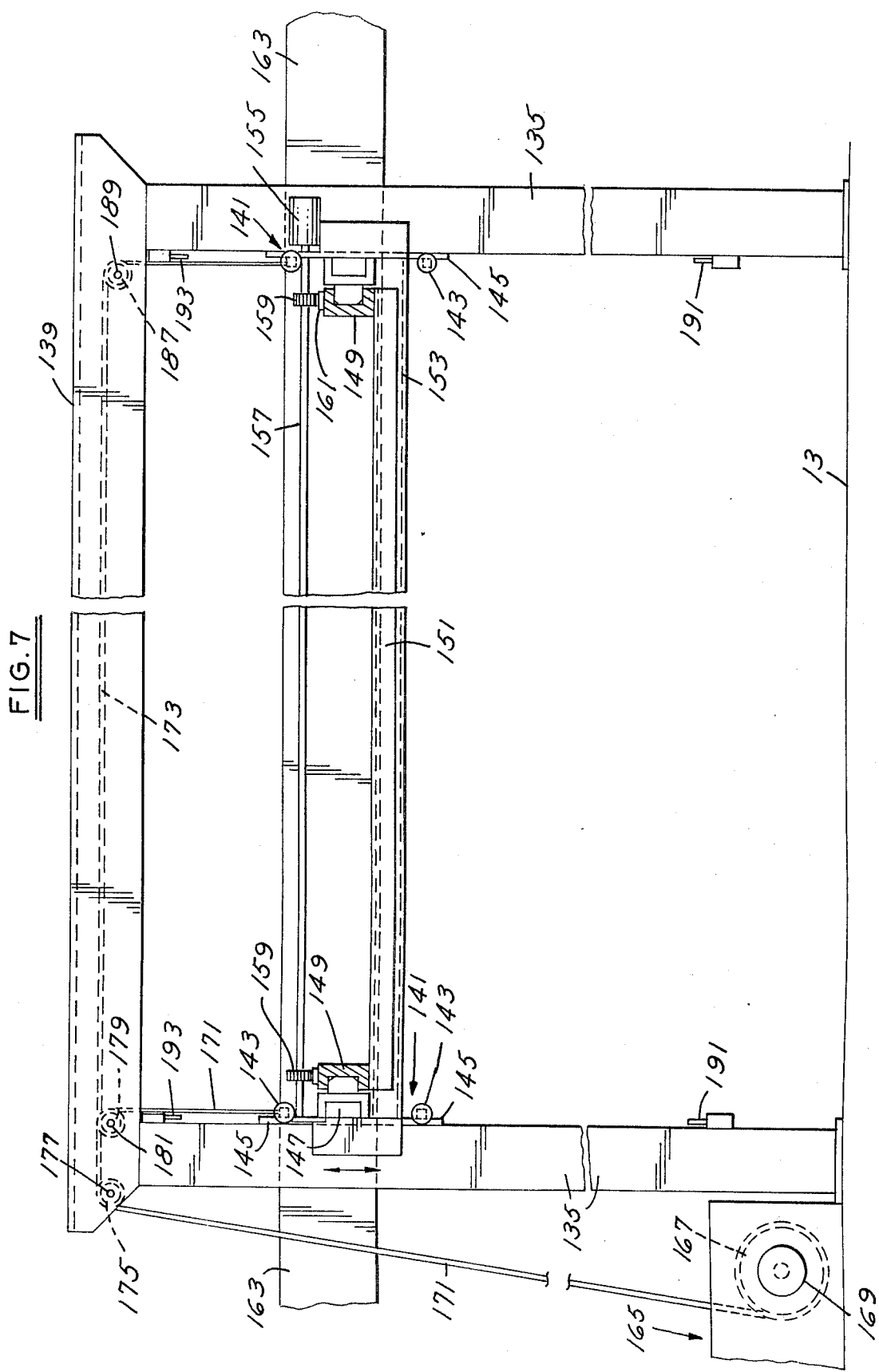
FIG. 7 is a side elevational view of the support and standards for mounting the support carriages, taken in the direction of arrows 7—7 of FIG. 6, a portion of the cross slide being sectioned.

Each of the slide carriers 141 mounts upon the corresponding standard 135 the transverse C-channel 147 with the respective C-channels between said slide carriers interconnected by the carriage cross support 153, FIG. 7.

Adjustably mounted upon said cross support are a pair of parallel spaced cross beams 149 of C-shape, FIG. 7, interconnected by a pair of parallel spaced cross beam channel spacers 151, forming a part of the cross slide. Said cross slide is adapted for in and out movements upon standards 135 in a direction at right angles to the longitudinal axis between the headstock and tailstock of the welding machine.

In order to feed the cross slide including the cross beams 149 inwardly and outwardly, there is provided a motor 155, FIG. 7, supported upon cross support 153, whose output shaft is axially connected to the elongated drive shaft 157 which spans the cross slide beams 149 and mounts pinions 159. Said pinnions are in mesh with corresponding rack gears 161 upon the top surfaces of beams 149.

Upon the inner ends of the beams 149 forming a part of the cross slide, is an elongated support beam 163, FIGS. 4, 5, 6 and 7 suitably secured upon the ends of said cross beams in a horizontal plane parallel to said axis and arranged above caster roll R. Said beam extends outwardly beyond the respective standards 135, FIGS. 4 and 5.

Adjacent tailstock 51, 53 and mounted upon the support surface 13 is a power winch 165 mounting a drum 167 including a reversible motor 169 controlling movement of a pair of cables 171 and 173 wound upon said drum. Said cables extend around the respective pulleys 175 and 185 journaled upon shaft 177 upon top channel 139 at one end thereof. Cable 171 extends over pulley 175, around pulley 179 and at its free end is connected to the left hand slide carriage 141, FIG. 7.

The other cable 173 extends over pulley 185, within and along the length of top channel 139 of said support, over the pulley 187 upon shaft 189 and at its free end is connected to the other of the slide carriers 141. Controlled vertical adjustment of the cross slide 149–151 is regulated by activation of winch 165 for raising and lowering the slide carriers 141 mounted upon the respective standards 135, with the slide carriers moving in unison.

Mounted upon the respective standards 135 at their lower ends are a pair of down limit switches 191 with corresponding up limit switches 193 at their upper ends. Said switches are adapted for engagement by slide carrier plates 145 on downward feed movement of the slide carriages and alternately a movement thereof automatically deenergizing motor 169 for said winch.

Movably and adjustably mounted upon support beam 163, in the illustrative embodiment, are a pair of longitudinally spaced travel carriage assemblies 195, FIGS. 4, 5 and 6, one of which is described in detail. Each travel carriage assembly includes an upright carriage 197 having a right angularly related top 199 movably supported upon beam 163. Said carriage and top mount spaced guide rollers 201 which are mounted upon vertical axes upon opposite sides of beam and are in guided engagement therewith.

The travel carriage assembly includes reversible electric motor 203, FIG. 6, whose output shaft drives the pinion 205 in mesh with the longitudinal rack 207 secured upon and along the length of beam 163. Bracket 209 is secured to carriage plate 199 and supports the drum mount 211, upon whose shaft 213 is mounted a drum assembly 215 upon which is wound a coil of welding wire 217. Said wire may be of a 8620 steel or a Lincoln L-60 wire for use in conjunction with an 880 flux for welding.

Mounted upon carriage 197 and projecting laterally thereof, FIG. 6, is the transverse arm support 219 connected to the carriage welding head mounting 221, which mounts the welding head assembly 223. Depending from the welding assembly 223 is a tubular electrode holder 225 arranged at an angle of 15 degrees, approximately, to the vertical with respect to the longitudinal axis between the headstock and tailstock.

Mounted upon the welding head assembly 223 is a Hobart solid state Model 45 wire drive feed head 227 having pairs of vertically spaced guide rolls 229 with an intermediate feed roll 231 for advancing the welding wire 217 between the guide rolls 229 through the tubular electrode holder 220 exiting at the surface of the caster roll R, FIG. 4. The solid state wire drive feed head is a conventional unit purchased on the market from Hobart Brothers Company of Troy, Ohio and includes roll tension adjuster 235.

The welding wire 217 as it is fed off its supporting drum guidably extends through wire guides 233, through the respective guide rolls 229 and drive rolls 231 and during welding is continually advanced toward the submerged ark type of welding employed upon caster roll R.

In conjunction with the operation of the welding head assembly 223, there is employed the upright flux storage hopper 237, suitably bracketed to the carriage 197, having a depending flexible feed tube 239 for delivering flux through the flux feed 241 which is spaced from the electrode holder 225 for providing a flow of flux onto the surface being welded.

A flux recovery head 243, FIG. 6, extends at an angle of approximately 20° to the vertical with respect to the axis between the head stock and tailstock and is in the path or rotation of the roll R for scavenging and recovering unused flux which is drawn through the tube 245 and into the primary flux separator tank 247. This product is available on the market and is referred to as an Invincible 682 series flux separator.

This flux separator includes a vacuum pipe 249 connected to a source of vacuum for sucking up the excess flux through the tube 245 and into the separator. The vacuum operated separator removes slag and fused particles from the returned flux through a suitable filter. Flux, through the pipe 251 and control valve 253 is fed back into flux hopper 237, FIG. 4.

Also mounted upon the carriage 197 is the carriage control panel 255 with manual control 257 for setting and controlling the operation of the carriage drive reversible motor 203 under the control of a variable transformer connected to control knob 257. Carriages speed can be preset by control 257.

When using a 420 stainless steel wire, submerged arc welding is at 32 volts and 450 amps for illustration.

The control panel 259, FIG. 11, schematically shows a pair of pyrometers 273 containing chart paper recording time and temperature, and are connected respectively to the pair of thermocouples, FIGS. 4, 5 and 8. Each recorder 273 has a control knob 275.

The recorders may be purchased from Leeds & Northrup and referred to as a SPEED-O-MAX, H-Model Recorder.

METHOD OF CASTER ROLL RECONDITIONING

Once it has been determined that a particular castor roll, or other type of steel roll requires welding for cracks and the like, there is the initial conventional step of low grade stress relieving of the roll by setting the roll R in a furnace and gradually, at 150° F. per hour maximum, bring the roll up to a temperature of 750° to 800° F. The roll is soaked for three hours or for such sufficient time as is required to bring the temperature up to 800° F., and is thereafter gradually cooled at 150° F. per hour maximum to ambient temperature.

Figure 1:
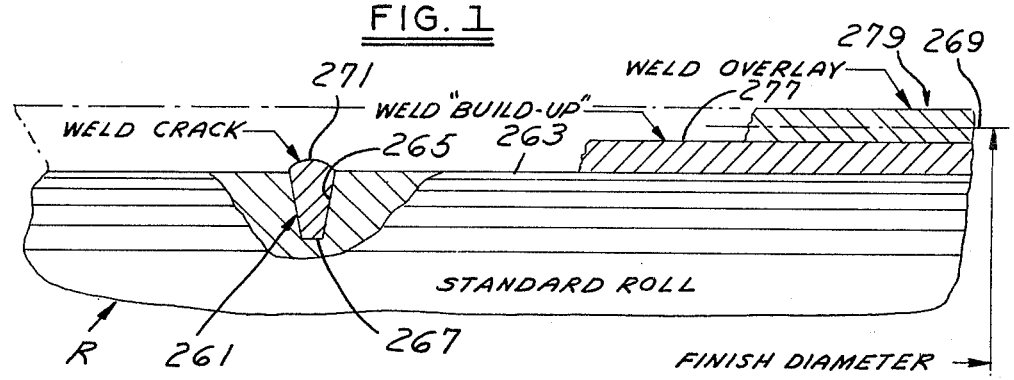
FIG. 1 is a fragmentary partly sectioned side elevation of a portion of a standard caster roll illustrating machining steps, gouging of a crack in the roll surface, which is undercut to provide a weld build up and weld overlay.
Figure 2:
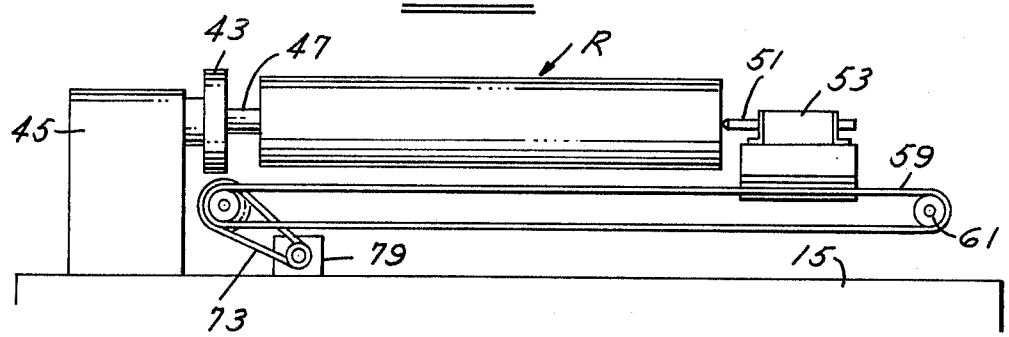
FIG. 2 is a schematic side elevation of the caster roll mounted upon its axis between a head stock and tail stock of a roll welding machine.

Thereafter as is also conventional, there is an ultrasonic inspection of the roll for crack determination and for making records of the location of such cracks, as at 261, FIG. 1. The exterior surface of the roll R is machined undercutting the roll diameter as at 263, FIG. 1. The respective cracks are machine gouged as at 265, FIG. 1 and down to a depth 267, FIG. 1 in preparation for the application of the weld 271. The gouge at its base is of a width in the range of ⅛ to ¼ of an inch.

As a further conventional step in preparation for welding, the roll R is preheated in a suitable furnace and made ready for welding with its temperature gradually brought uniformly, at 150° F. per hour, to the required welding preheat temperature of 600° F., minimum. Normally this heat cycle is monitored and recorded in connection with a pyrometer chart to visibly indicate time and temperature as the roll is slowly preheated for preparation for welding.

As a step in the present roll welding process, the preheated roll R is assembled onto the roll welding machine and retained and journaled with respect to the headstock 43 and tail stock 51, and supported upon a longitudinal axis between said headstock and tailstock which corresponds to the longitudinal axis of the caster roll or other roll to be welded.

The preheated roll, as assembled into the roll welding machine, is enclosed by the end and side screens 33 and 35 to thereby define around the preheated caster roll, a uniform heat zone for maintaining the preheat of the roll at least to the minimum 600° F. as is required.

The maintenance of the roll at such predetermined temperature is determined by the thermocouples 119 for visible reading at the dials 123 and for reading upon the pyrometer charts shown at 273, FIG. 11 on the control panel 259.

By monitoring the temperature of the preheated roll so as to maintain the roll temperature at 600° F., approximately, as a minimum temperature, welding can be initiated to first fill and weld the machine gouged cracks as at 265, FIG. 1 completing the weld as shown at 271. There will be a series of passes of the welding head and welding wire 217, FIG. 6, in conjunction with the required welding flux until the crack has been filled. This may require a number of passes of the welding head with respect to the machine gouge and with such continuous or intermittent rotation of the roll under the control of the head stock, and utilizing the weld filler, such as L-60 or 420 SS.

Thereafter steel from the welding rod 217 is applied to the surface of the roll adjacent the weld 271 to provide the weld build up 227 which serves as a cushion and the weld overlay 279 applied thereto which is for illustration approximately ⅛ inch thick, wherein a steel referred to as Pioneer 2250-2 may be employed.

The welding wire 217 is automatically fed under the control of the feed control 227. The other components are supplied by Hobart Brothers Company of Troy, Ohio and are under the control of Wire Feed Motor Control 281 referred to as Hobart Model 101, FIG. 11.

Applied to the control panel are the conventional basic controls 283 schematically shown and illustrated in FIG. 11 which show the controls and indicators for the gas solenoid valves, the off and on switch and other components in the present control system for the roll welding machine.

The important factor with respect to the novel steps in the reconditioning of welding rolls is by utilizing the uniform heat zone closure for the preheated caster roll during all welding operations, the heat of the roll is continuously maintained at the minimum of 600° F., approximately, and at the same time is continuously monitored at the thermocouple dials 123, FIGS. 4 and 5 and by the pyrometer recorders and charts 273 shown in FIG. 11 on the control panel.

Thus, there can be monitored continuously and at all times the fact that the caster roll or other roll being welded was maintained at the minimum preheat temperature during all welding and that the charts in a conventional manner will verify time and temperature of the roll throughout such periods which is available for visual information on the job. Subsequently the charts can be stored with respect to a particular roll to verify the history and the basis and conditions under which the roll was weld repaired. The present method therefor contemplates the continuous monitoring and recording of the temperature of the roll during all welding operations, as well as maintaining a continuous temperature of the roll during welding.

Since the machine gouges for the cracks are normally transverse to the longitudinal axis, it is contemplated that the roll, under the control of the headstock, will be incrementally rotated up 360°, so that welding can occur throughout all areas of the roll and with the assurance that the preheat temperature has been maintained at all times.

As a further step, not necessarily a step of the method having novelty, the roll as finally welded in FIG. 1, is machined to the finish diameter designated at 269.

Having described my invention, reference should not be had to the following claims:

I claim:

1. A roll welding machine comprising a frame mountable upon a support surface;
   a power driven head stock mounted on said frame;
   a tail stock mounted on said frame for longitudinal adjustment relative to head stock, said headstock and tail stock defining a longitudinal axis and axially mounting an elongated steel caster roll having a crack therein;
   an elongated gas manifold having a series of longitudinally spaced burner outlets, connected to a gas source under pressure spaced below said axis and underlying said roll for maintaining said roll at a predetermined temperature;
   an upright support of inverted U-shape parallel to and laterally spaced from said axis, secured to said frame and including front and rear standards adjacent said heat stock and tail stock respectively;
   a pair of upright slide carriers slidably mounted upon said standards adapted for vertical adjustments thereon;
   a cross support interconnecting said carriers;
   a pair of spaced interconnected cross slide beams within said upright support extending at right angles to said axis and adjustably mounted upon said cross support for movements transversely of said axis;
   a support beam spaced above and parallel to said axis and interconnecting the inner ends of said cross slide beams with its ends projection outwardly of said standards;
   a travel carriage guidably and movably mounted upon said support beam along its length spaced above and parallel to said axis;
   a welding head assembly mounted upon and depending from said travel carriage having a tubular electrode holder outletting adjacent said roll;
   a welding wire drive feed head upon said welding head assembly for feeding welding wire through said electrode holder into registry with said roll;
   and a coil of welding wire journalled upon said carrier adapted for continuously delivering welding wire to said drive feed head;
   said welding head assembly being adjustable horizontally and vertically relative to said axis, and longitudinally movable reciprocally along the length of said roll, with intermittent rotation of said roll along said axis.

2. In the roll welding machine of claim 1, an enclosure means mounted upon said frame spaced from and surrounding said roll at its sides and ends and extending below said roll enclosing said gas manifold defining a uniform heat zone, for continuously maintaining said roll at said predetermined temperature throughout all welding thereof.

3. In the roll welding machine of claim 1, said predetermined temperature being 600° F., approximately.

4. In the roll welding machine of claim 2, said predetermined temperature being 600° F., approximately.

5. In the roll welding machine of claim 2, said enclosure means including upright pairs of spaced supports at opposite ends of said frame and secured thereto;
   coplanar horizontal support means at their ends connected to adjacent pairs of standards;
   and upright spaced side and end screen plates at their upper longitudinal edges secured to said support means and depending therefrom with their lower horizontal edges spaced below said roll, said end plates being spaced from the ends of said roll.

6. In the roll welding machine of claim 5, securing of said plates to said support means including a plurality of spaced clips mounted on and along said support means and retainingly engaging said screen plates.

7. In the roll welding machine of claim 5, said screen plates being imperforate.

8. In the roll welding machine of claim 2, a pair of spaced thermocouple pyrometers on said frame adjacent with said roll;
   and a pair of electronic recorders upon said frame mounting charts for continuously recording the time and temperature of said roll, for verification of the maintenance of said predetermined temperature.

9. In the roll welding machine of claim 1, the mounting of said tail stock including a mount plate supporting said tail stock, spanning and slidably mountable upon said frame;
   a pair of laterally spaced horizontal closed sprocket conveyor chain loops mounted upon opposite sides of said frame;
   said mount plate overlying and secured to the top of each sprocket chain;
   and motor means drivingly engaging said sprocket chains.

10. In the roll welding machine of claim 1, said gas manifold extending between said head stock and tail stock for providing heat along the full length of said roll.

11. A roll welding machine comprising a frame;

a power driven head stock mounted on said frame;

a tail stock adjustably mounted upon said frame, said head stock and tail stock defining a longitudinal axis and axially supporting an elongated steel caster roll having a crack therein;

an elongated gas manifold pipe having a series of longitudinally spaced burner outlets, connected to a pressurized gas source, spaced below said axis and underlying said roll, for maintaining said steel roll at a predetermined temperature;

an upright support of inverted U-shape parallel to and laterally spaced from said axis and secured to said frame, including front and rear standards of channel form adjacent said heat stock and tail stock respectively;

a pair of upright laterally interconnected spaced slide carriers guidably mounted upon said standards adapted for vertical adjustment thereon;

a cross slide within said upright support extending at right angles to said axis and adjustable mounted thereon for movement transversely of said axis;

a support beam spaced above and parallel to said axis and mounted on said cross slide;

a travel carriage guidably and movably mounted upon said support beam along its length spaced above and parallel to said axis;

a welding head assembly mounted upon and depending from said travel carriage having a tubular electrode holder adjacent said roll;

a welding wire drive feed head upon said welding head assembly for feeding welding wire through said electrode holder into registry with said roll;

and a coil of welding wire journaled upon said carriage adapted for continuously delivering welding wire to said feed head;

said welding head assembly being adjustable relative to said axis horizontally and vertically, and longitudinally movable along the length of said roll with intermittent rotation of said roll along said axis.

12. In the roll welding machine of claim 11, an enclosure means mounted upon said frame and spaced from and surrounding said roll at its sides and ends and extending below said roll enclosing said gas manifold defining a uniform heat zone, for continuously maintaining said roll at said predetermined temperature throughout all welding thereof.

13. In the roll welding machine of claim 12, said enclosure including upright pairs of spaced supports at opposite ends of said frame and secured thereto;

coplanar horizontal support means at their ends connected to adjacent pairs of standards;

an upright spaced side and end screen plates at their upper longitudinal edges secured to said support means and depending therefrom with their lower elongated edges spaced below said roll, said feed plates being spaced from the ends of said roll.

14. In the roll welding machine of claim 1, said gas manifold including a series of aligned gas piles arranged end to end extending between said head stock and tail stock, adapted to uniformly heat and continuously maintain said roll at said predetermined temperature.

15. In the roll welding machine of claim 14, a tubular pedestal support for each gas pipe mounted upon said frame;

and a support for depending from said pipe centrally thereof and adjustably positioned within and secured to said pedestal support for selectively spacing said pipes from said axis.

16. In the roll welding machine of claim 1, each slide carrier being positioned within a standard and projecting outwardly thereof;

vertically spaced guide rollers upon each slide carrier retainingly engaging the corresponding standard.

17. In the roll welding machine of claim 16, a power operated winch upon said support surface adjacent a standard, including a drum mounting a pair of cables;

a plurality of spaced pulleys journaled upon said upright support at the upper ends of said standards;

said cables extending over said pulleys respectively and at their ends connected to said slide carriers for effecting simultaneous up and down movements thereof, said support beam, said travel carriage and said welding head assembly mounted thereon.

18. In the roll welding machine of claim 1, the adjustment of said cross slide and support beam including a rack gear upon each beam;

a reversible motor mounted upon said carrier cross support;

an elongated horizontal drive shaft connected to said motor spanning said standards;

and a pair of pinions on said shaft engaging said rack gears respectively.

19. In the roll welding machine of claim 1, a reversible motor having a drive shaft mounted upon said travel carriage;

an elongated rack gear mounted upon and along said support beam;

and a pinion on said drive shaft in mesh with said rack gear.

20. In the method of weld reconditioning of caster roll for steel mills wherein the cracks are machine gauged and adjacent roll surfaces are machined and undercut for receiving weld build up and weld overlay, and preheating the roll to a minimum uniform temperature of 600° F., approximately, the improvement which comprises;

mounting an elongated steel roll for support and rotation about its longitudinal axis within a roll welding machine;

loosely enclosing the roll upon its sides and ends to define a uniform heat zone chamber surrounding said roll;

positioning a source of heat below and along the length of said roll within said chamber, continuously maintaining said roll at said uniform minimum temperature;

and simultaneously welding and filling said machine gouges, applying weld build up and weld overlay;

said source of heat maintaining said minimum heat and interpass minimum temperature during all welding operations.

21. The method of claim 20, and continuously monitoring and recording the temperature of said roll during all said welding operations.

22. The method of claim 21, said monitoring including applying a plurality of thermocouples to spaced portions of said roll;

and connecting a pyrometer including a chart to each thermocouple for visual verification of time and temperature conditions during welding, and for storage and verification of said time and temperature conditions.

23. In the method of claim 20, feeding and reciprocating a welding head assembly longitudinally of said roll;

an incrementally rotating said roll up to 360°.

* * * * *